US005657343A

United States Patent [19]
Schilling

[11] Patent Number: 5,657,343
[45] Date of Patent: Aug. 12, 1997

[54] FREQUENCY HOPPING CODE DIVISION MULTIPLE ACCESS SYSTEM AND METHOD

[75] Inventor: Donald L. Schilling, Sands Point, N.Y.

[73] Assignee: InterDigital Technology Corporation, Wilmington, Del.

[21] Appl. No.: 542,346

[22] Filed: Oct. 12, 1995

Related U.S. Application Data

[63] Continuation of Ser. No. 297,449, Aug. 29, 1994, Pat. No. 5,459,759, which is a continuation of Ser. No. 19,114, Feb. 17, 1993, abandoned.

[51] Int. Cl.$^6$ .......................... H04B 1/713; H04J 13/06; H04Q 7/22
[52] U.S. Cl. .......................... 375/202; 370/335; 370/441; 455/450
[58] Field of Search .......................... 375/202, 200, 375/205, 347; 370/18, 335, 342, 441, 479; 379/59; 455/33.1, 33.3, 54.1

[56] References Cited

U.S. PATENT DOCUMENTS

| | | | |
|---|---|---|---|
| 4,222,115 | 9/1980 | Cooper et al. | 375/1 |
| 4,479,226 | 10/1984 | Prabhu et al. | 375/1 |
| 4,710,944 | 12/1987 | Nossen | 375/347 |
| 4,750,036 | 6/1988 | Martinez | 375/200 |
| 4,803,738 | 2/1989 | Ikeda | 455/10 |
| 4,829,540 | 5/1989 | Waggener, Sr. et al. | 375/1 |
| 4,850,036 | 7/1989 | Smith | 455/179 |
| 4,901,307 | 2/1990 | Gilhousen et al. | 370/18 |
| 4,947,452 | 8/1990 | Hattori et al. | 455/33 |
| 5,056,109 | 10/1991 | Gilhousen et al. | 375/1 |
| 5,073,900 | 12/1991 | Mallinckrodt | 375/1 |
| 5,101,501 | 3/1992 | Gilhousen et al. | 455/33 |
| 5,103,459 | 4/1992 | Gilhousen et al. | 375/1 |
| 5,129,096 | 7/1992 | Burns | 455/18 |
| 5,164,958 | 11/1992 | Omura | 375/1 |
| 5,177,604 | 1/1993 | Martinez | 375/200 |
| 5,247,699 | 9/1993 | Hartman | 379/59 |
| 5,257,398 | 10/1993 | Schaeffer | 455/33.1 |
| 5,301,188 | 4/1994 | Kotzin et al. | 370/50 |
| 5,428,602 | 6/1995 | Kemppainen | 370/18 |
| 5,440,636 | 8/1995 | Herrick | 375/200 |
| 5,459,759 | 10/1995 | Schilling | 375/202 |

FOREIGN PATENT DOCUMENTS

| | | |
|---|---|---|
| 2228163 | 8/1990 | United Kingdom . |
| 9307702 | 4/1993 | WIPO . |

*Primary Examiner*—Stephen Chin
*Assistant Examiner*—Jeffrey W. Gluck
*Attorney, Agent, or Firm*—David Newman & Associates, P.C.

[57] ABSTRACT

A frequency-hopping-communications system, assigned a system bandwidth B, with the system bandwidth B divided into N sets of frequencies, with each set of the N sets of frequencies not having the same frequencies as other sets of the N sets of frequencies, for communicating base-message data to a plurality of remote units. The frequency-hopping-communications system includes a plurality of base stations for communicating base-message data to the plurality of remote units. Each of the base stations has a coverage area divided into a plurality of N concentric regions with each concentric region assigned one of the N sets of frequencies. For communicating with a selected-remote unit located within a particular-concentric region, each base station has a modulator for converting the base-message data to a form suitable for sending over radio waves, a frequency-hopping device for frequency hopping the converted-base-message data over a set of frequencies assigned to the particular-concentric region, thereby generating a frequency-hopped signal, a controller, responsive to the selected-remote unit being located in the particular-concentric region, for controlling the set of frequencies use by said frequency-h hopping device, a power amplifier for amplifying the frequency-hopped signal from the base station to the remote unit, and a base antenna coupled to the power amplifier for radiating the frequency-hopped signal. Each of the remote units has a receiver for recovering from the frequency-hopped signal the base-message data.

5 Claims, 10 Drawing Sheets

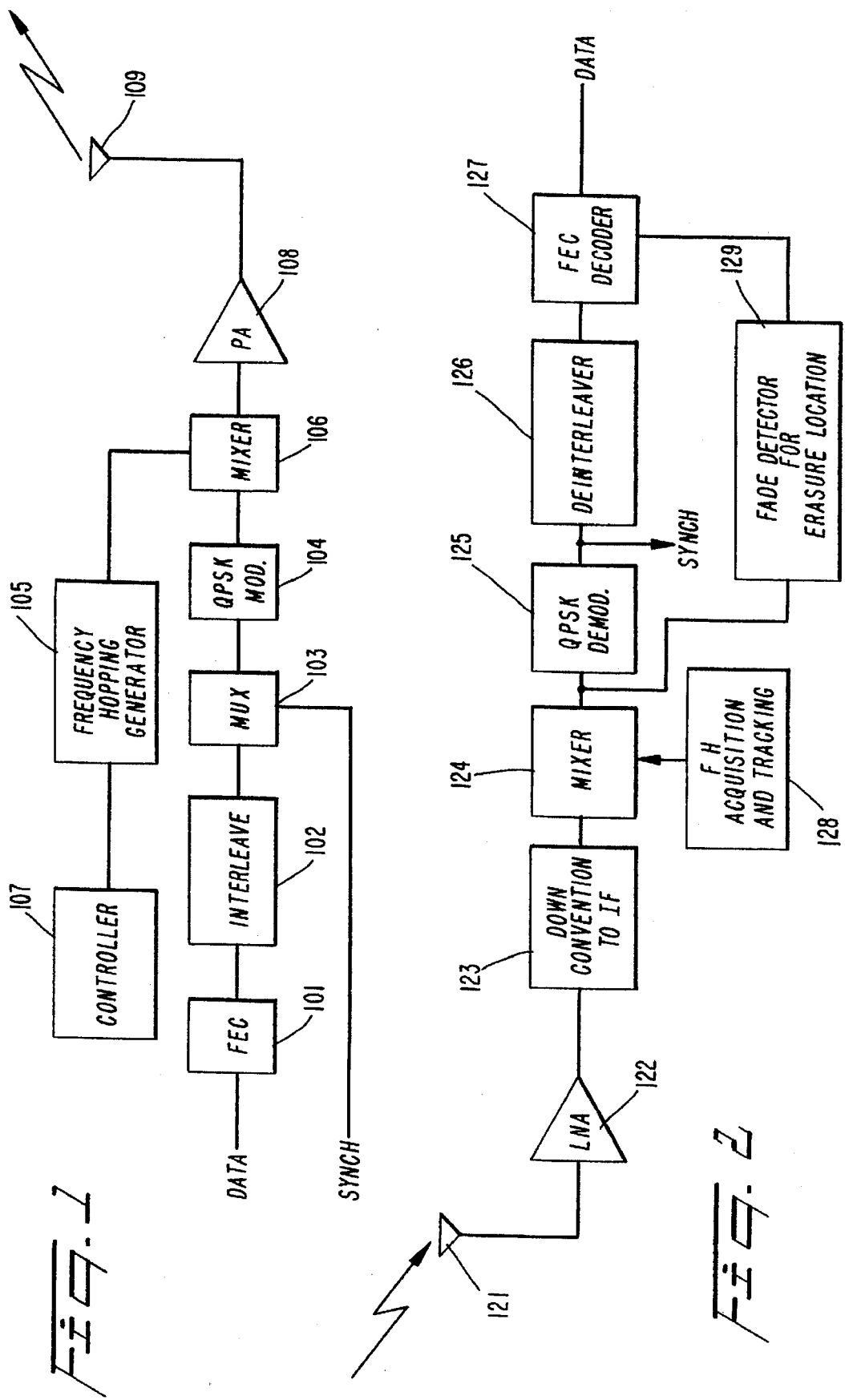

FREQUENCY HOPPING CODE DIVISION MULTIPLE ACCESS SYSTEM AND METHOD

RELATED PATENTS

This Patent is a continuation of U.S. Patent application entitled, FREQUENCY HOPPING CODE DIVISION MULTIPLE ACCESS SYSTEM AND METHOD, having Ser. No. 08/297,449 and filed Aug. 29, 1994, now U.S. Pat. No. 5,459,759 with issue date Oct. 17, 1995, which is a file wrapper continuation of U.S. application having Ser. No. 08/019,114 and filing date Feb. 17, 1993, now abandoned. The benefit of the earlier filing date of the parent patent applications is claimed pursuant to 35 U.S.C. §120.

BACKGROUND OF THE INVENTION

This invention relates to spread spectrum communications, and more particularly to a frequency hopping, code division multiple access, microcellular or cellular communications system, in which the maximum capacity per sector can approach or exceed the total bandwidth of the system divided by the bandwidth occupied by the frequency hopping signal during any dwell. This ratio is called the processing gain.

DESCRIPTION OF THE RELEVANT ART

The frequency spectrum is extremely congested. To ensure that the worldwide need for increased communication services is met, more spectrum must be found. In an attempt to meet these needs, the Federal Communications Commission (FCC) recently has set aside the frequency bands of 1850–1990 MHz, 2110–2150 MHz, and 2160–2200 MHz, for emerging technology services. The 1850–1990 MHz band has been set aside for Personal Communication Services (PCS). Additionally, the FCC has allocated spectrum under Part 15 of the FCC rules, for spread spectrum use.

PCS is expected to become, during the 1990s, a business of significantly more than $100 billion, annually. PCS is a One Phone concept, in which a single phone can be used in the home in lieu of a cordless phone; in the street with a wireless local loop; in the vehicle with a cellular type system; and, in the office with a wireless private branch exchange (PBX). The One Phone will provide wired line quality voice and integrated service digital network (ISDN) data rates, with wireless convenience. Used with an intelligent network, a call placed to a user will reach the user, no matter where the user is located.

The newly set aside PCS frequency band presently is inhabited by licensed, fixed service, microwave users. These microwave users transmit data point-to-point using towers approximately 150–200 feet high separated by about 10–20 miles. Their systems employ one watt power amplifiers and four degree beamwidth antennas.

In earlier experiments, a direct sequence spread spectrum CDMA system was demonstrated to share, i.e., overlay, the spectrum with the microwave users without causing significant attenuation, by limiting the capacity of the CDMA system. The co-sharing proposal centered about using a 48 MHz bandwidth for the CDMA system. Thus, the power reaching the fixed microwave receiver from a PCS user was attenuated by 7 dB, i.e., 4.8. Additional attenuation resulted because the PCS user is not within the narrow beamwidth of the fixed service microwave user's antenna. The FCC's recent ruling limits the bandwidth to 15–20 MHz full duplex. Thus, a 15–20 MHz band can be allocated for transmission and a second 15–20 MHz band can be allocated for reception. This ruling reduces the direct sequence spread spectrum capacity by about 4 to 5 dB. These results are shown in Table I for experimental data taken in the suburbs of Orlando and Houston, and in densely urban New York, using a 48 MHz bandwidth. The results presented in this table for the 15 MHz bandwidth were obtained by multiplying the first column by 15/48. The reason that more users could overlay in New York City is that the tall buildings blocked the line-of-sight path between a PCS user and a microwave user. Hence, any PCS signal reaching the microwave antenna is severely attenuated.

TABLE I

| | Number of Users/Base Station | |
|---|---|---|
| | Experimental Results (48 MHz Bandwidth) | Calculated Results (15 MHz Bandwidth) |
| Houston | 46 | 14 |
| Orlando | 34 | 10 |
| New York City | 538 | 168 |

If no overlay were needed, i.e., all microwave users were removed from the frequency band, then the maximum capacity, C, of a PCS microcellular system could be $$C = f_c/f_b, \quad (1)$$

where $f_c$ is the chip rate of the direct sequence (DS) spread spectrum system and $f_b$ is the data rate. Using a data rate of 32 kilobits per second (kb/s) to ensure toll quality voice and a bandwidth of 48 MHz, each cell could service up to 538 simultaneous calls while a 15 MHz bandwidth system could handle up to 168 simultaneous calls.

In order to eventually achieve the much higher capacity possible in the non-overlay mode, the FCC has given the microwave users 3–10 years to leave the PCS band and move to a higher frequency band. During the interim period, overlay will enable the PCS business to develop in a reasonable fashion and provide for a smooth transition.

Frequency hopping (FH) CDMA is an alternate approach which allows sharing the band with the microwave users by hopping over them, i.e., by excluding frequencies used by the microwave users. A frequency hopping signal typically is a quadrature phase shift keyed (QPSK) or binary frequency shift keyed (BFSK) signal which changes frequency at regular time intervals, called the hop duration. If the bandwidth occupied by the frequency hopping signal during any dwell were $f_b$ and the total bandwidth of the system were B, then the system capacity, C, ideally becomes $$C = B/f_b \quad (2)$$

Comparing Eqns. (1) and (2), the FH/CDMA and the DS/CDMA systems have approximately the same capacity if $f_c = B$.

Typically, however, the capacity of a FH/CDMA system is limited to a much lower value than given by Eqn. (2). The reasons for this are:

1. If N frequency hop users change frequency at random times and with a pseudo random sequence, then the probability of two users landing on the same frequency at the same time, thus causing a collision and producing errors, increases rapidly with N, thereby limiting N to about 10% of capacity.

2. If users in one cell used all C frequency "bins", then the users in adjacent cells would have to use the same frequencies, thereby interfering with one another. To avoid such interference, frequency reuse could be employed, thereby limiting the number of users to about 1/7, or 15% capacity.

OBJECTS OF THE INVENTION

A general object of the invention is a frequency hopping, code division multiple access cellular communications system.

Another object of the invention is maximizing channel capacity, i.e., having the optimum number of users per cell, of a frequency hopping, code division multiple access cellular communications system.

An additional object of the invention is a highly effective usage of the frequency spectrum of a frequency hopping, code division multiple access cellular communications system.

A further object of the invention is an inexpensive personal communications system, which can compete with the current wire telephone system and the cellular systems already in use.

SUMMARY OF THE INVENTION

According to the present invention, as embodied and broadly described herein, a frequency-hopping-communications system is provided, comprising a plurality of base stations, with each base station communicating with a plurality of remote units. The plurality of base stations communicates base-message data to a plurality of remote units.

The frequency-hopping-communications system is assigned a system bandwidth B. The system bandwidth B is divided into N sets of frequencies. Each set of the N sets of frequencies does not have the same frequencies as other sets of the N sets of frequencies.

Each of the base stations has a coverage area divided into a plurality of N concentric regions. Each concentric region is assigned one of the N sets of frequencies.

Each of the base stations can communicate with one or more remote units located within a particular-concentric region surrounding the base. Each base station has base-modulator means, base-hopping means, base-controller means, base-power means and base-antenna means. The base-modulator means converts the base-message data to a form suitable for sending over radio waves. The base-hopping means frequency hops the converted-base-message data over a set of frequencies assigned to the particular-concentric region. The resulting signal is a frequency-hopped signal. In response to a selected-remote unit being located in a particular-concentric region, the base-controller means controls the set of frequencies used by the base-hopping means. The base-power means amplifies the frequency-hopped signal to be transmitted. The base-antenna means is coupled to the base-power means. The base-antenna means radiates the frequency-hopped signal over the coverage area from the base station to the remote unit.

Each of the remote units has a remote antenna, and remote-receiver means. The remote antenna receives the frequency-hopped signal, and the remote-receiver means recovers from the frequency-hopped signal the base-message data.

The remote-receiver means may include remote-acquisition-and-tracking means and remote demodulator means. The remote-acquisition-and-tracking means acquires and tracks the frequency-hopped signal, to generate a dehopped signal. The remote-demodulator means is coupled to the remote-acquisition-and-tracking means, and demodulates the dehopped signal into the base-message data.

The present invention additionally may have base-antenna means for sectoring the cover area into a plurality of sectors. When the selected-remote unit is located within a particular sector and a particular geographic region, the base-controller means sets the set of frequencies used by the base-hopping means for communicating with the selected remote unit.

The present invention also includes a frequency-hopping-communications method for communicating base-message data to a plurality of remote units. As with the frequency-hopping communications system, the method uses an assigned system bandwidth B, with the system bandwidth B divided into N sets of frequencies, with each set of the N sets of frequencies not having the same frequencies as other sets of the N sets of frequencies. Each of the base stations has a coverage area divided into a plurality of N concentric regions with each concentric region assigned one of the N sets of frequencies. At the base station, the method includes the steps of converting the base-message data to a form suitable for sending over radio waves; frequency hopping the converted-base-message data over a set of frequencies assigned to the particular-concentric region, thereby generating a frequency-hopped signal; controlling, in response to the selected-remote unit being located in the particular-concentric region, the set of frequencies used by the base station; amplifying the frequency-hopped signal; and transmitting the frequency-hopped signal from the base station to the remote unit.

At each of the remote units, the method includes the steps of receiving the frequency-hopped signal, and recovering, from the frequency-hopped signal, the base-message data.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims:.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 1 is a block diagram of a FH/CDMA transmitter;

FIG. 2 is a block diagram of a FH/CDMA receiver;

DETAILED DESCRIPTION OF THE PREFERRED EMBODIMENTS

Figure 3:
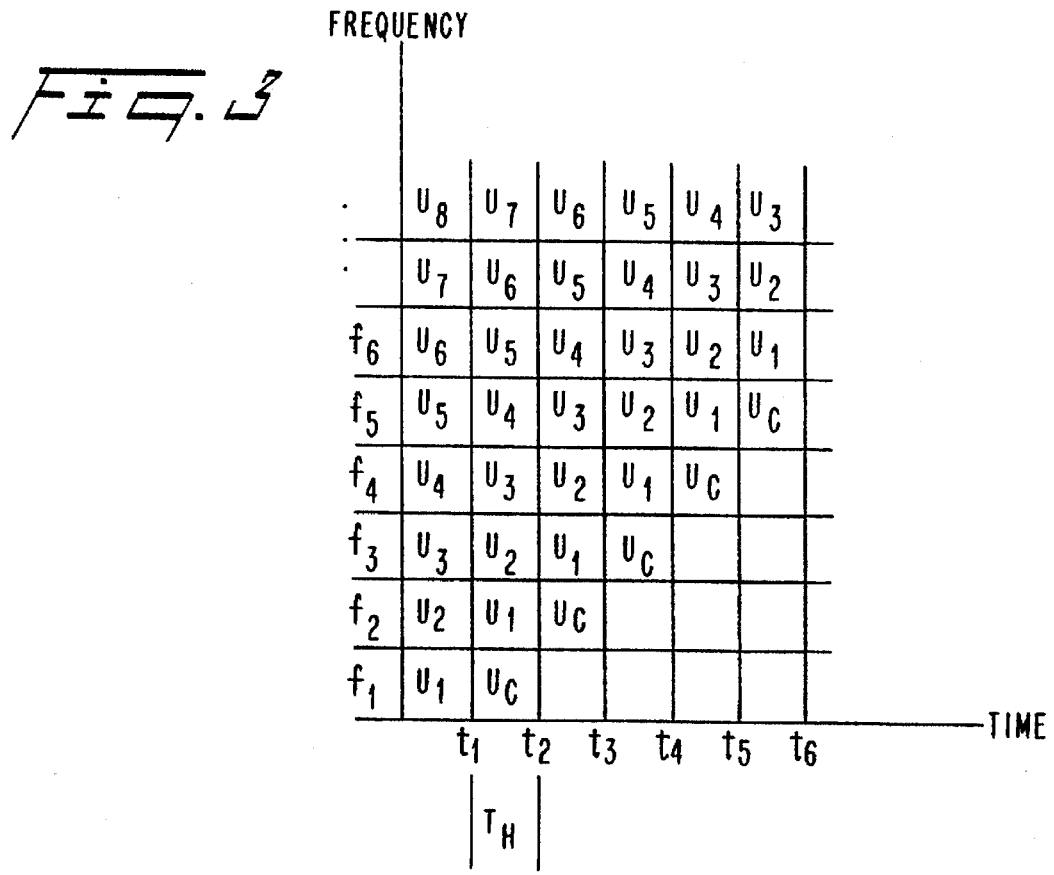
FIG. 3 illustrates the frequency time schedule to avoid intracell interference.

Reference now is made in detail to the present preferred embodiments of the invention, examples of which are illustrated in the accompanying drawings, wherein like reference numerals indicate like elements throughout the several views.

This specification discloses the invention and initial performance analysis of an FH/CDMA microcellular communication system. The invention has a general object of maximizing channel capacity. The resulting invention, therefore, while practical, is nonetheless complex; it makes use of coordinated frequency subbands and antenna sectors to minimize multiple access interference. Thus, while a system of this type requires, for example, more handoffs than might otherwise be needed, the system results in a highly effective usage of the frequency spectrum.

Frequency-hopping code division multiple access (FH/CDMA) utilizes an allocated spectrum by periodically changing a channel frequency, that is, the carrier frequency of the transmitted signal. The "changing" is called "hopping". The frequency hopping communications system and method disclosed herein selects those carrier frequencies, used by the frequency hopping transmitter, in a pseudorandom manner, i.e., from a table lookup. A frequency of any shared user, such as a pre-existing microwave user, who has a carrier frequency which has a bandwidth falling in the allocated spectrum, however, is locked out, i.e., not hopped on, by the frequency hopping transmitter in order to eliminate interference with the shared-user system.

The frequency-hopping-communications system and method has particular use for maximizing channel capacity, i.e., having the optimum number of users per cell, in an FH/CDMA cellular infrastructure. FH/CDMA technology may be less expensive than a competing direct sequence spread spectrum code division multiple access (DS/CDMA) system employing direct sequence modulation. A combination of frequency hopping with direct sequence (FH/DS) CDMA system also is possible in which hopping is used to ensure that the DS/CDMA system does not interfere with any existing user.

The frequency-hopping-communications system and method use a plurality of frequency hopping signals communicating simultaneously with a plurality of remote units, respectively, using an allocated band of frequencies. The overall bandwidth of the allocated band of frequencies is designated herein as a system bandwidth B. The system bandwidth B is divided into N sets of frequencies. Each set of the N sets of frequencies does not have the same frequencies as other sets of the N sets of frequencies.

The remote units may be mobile or in a fixed, stationary location. Message data are communicated between the base stations and the remote units. Message data include, but are not limited to, digitized voice, computer data, facsimile data, video data, etc. Base-message data are defined herein to be message data originating from a base station, and remote-message data are defined herein to be message data originating from a remote unit. Thus, the base station communicates base-message data to the plurality of remote units. A remote unit communicates remote-message data to the base station.

The term "base" is used as a prefix to indicate that an element is located at the base station, or that a signal originates from a base station. The term "remote" is used as a prefix to indicate that an element is located at a remote unit, or that a signal originates from the remote unit.

The present invention is taught using a base-station transmitter and a remote-unit receiver. Based on these teachings, a person skilled in the art would know that concepts of concentric regions and antenna sectoring can be used in a reciprocal manner, with a remote-unit transmitter and a base-station receiver.

In the exemplary arrangement shown in FIG. 1, each base station has base-modulator means, base-hopping means, base-controller means, base-power means and base-antenna means. The base modulator means may be embodied as a base modulator 104, which modulates base-message data using a phase shift keying (PSK) modulation, frequency shift keying (FSK) modulation, or any other type of modulation suitable for a FH/CDMA system. The PSK modulation may be any of binary phase shift keying (BPSK) modulation, quadrature phase shift keying (QPSK) modulation, M-ary phase shift keying (MPSK) modulation where M is larger than four, or variants of differential phase shift keying (DPSK) modulation. This disclosure teaches the invention, by way of example, with QPSK modulation. It is well known to those skilled on the art that other modulation types are equivalent and may be substituted for QPSK modulation.

As illustratively shown in FIG. 1, base-message data may be processed with a forward error correction (FEC) code by an FEC encoder 101, and bits of the base-message data may be interleaved by bit interleaver 102. The bit interleaver 102 is coupled to the FEC encoder 101, and the FEC encoder 101 has an input for the base-message data. A base multiplexer 103 is shown with an input for a base-synchronization signal, and is coupled to the base interleaver 102. A synchronization channel or pilot signal optionally can be sent with the base-message data by multiplexing a base-synchronization signal or pilot signal with the base-message data. For example, a set of frequencies may be set aside, and those frequencies could be reserved for hopping the pilot signal. The resulting multiplexed signal, or the base-message data if it were not multiplexed with a base-synchronization signal, is modulated by the base modulator 104. The base modulator 104 converts the base-message data to a form suitable for sending over radio waves. As mentioned previously, that form may be QPSK modulation.

The base-hopping means, frequency hops the converted-base-message data for a given remote user over a set of frequencies assigned to the particular-concentric region in which resides that remote user. The resulting signal is a frequency-hopped signal. In FIG. 1, the base-hopping means is embodied as a frequency-hopping (FH) signal generator 105, coupled to a base mixer 106. The base mixer 106 is coupled to the base modulator 104.

The base station has base-hopping means for hopping on a plurality of frequencies, simultaneously. Each of a plurality of remote units receives a respective signal from the base station on a different frequency, from the other remote units, at any dwell of a hop. The set of frequencies used for communicating from the base station to the remote unit may be in the same band as the set of frequencies used by the remote unit to communicate to the base station. Alternatively, the set of frequencies used for communicating from the base station to the remote unit may be in a band separate and distinct from the band having the set of frequencies used by the remote unit to communicate to the base station.

In response to the selected-remote unit being located in the particular-concentric region, the base-controller means controls the set of frequencies used by the base-hopping means. The base-controller means may be embodied as part of the FH controller 107, which assigns the set of frequencies used by the FH signal generator 105. The controller 107 may be a microprocessor or other digital signal processing circuit or chip.

The base-power means amplifies the frequency-hopped signal to be transmitted from the base station to each remote unit. The base power means is embodied as a base-power amplifier 108. The base-power amplifier 108 is coupled to the base mixer 106. The base-power amplifier 108 is optional, if sufficient power were available at the output of the base mixer 107.

The base-antenna means is coupled to the base-power means. The base-antenna means may be embodied as an omnidirectional antenna, or a directional antenna 109. In a preferred embodiment, by way of example, the base station may also have six directional antennas which divide the coverage area into six sectors of 60° per sector. Each directional antenna 109 provides the directional coverage for each sector, respectively. The base antenna 109 radiates the frequency-hopped signal over the coverage area, or a sector of the coverage area if directional antennas were employed. In this case the total capacity of the system is increased by six.

Each of the remote units, as illustrated in FIG. 2, has a remote antenna 121, and remote-receiver means. The remote antenna receives the frequency-hopped signal, and the remote-receiver means recovers from the frequency-hopped signal the base-message data.

The remote-receiver means may include remote-acquisition-and-tracking means and remote demodulator means. The remote- acquisition-and-tracking means acquires and tracks the frequency-hopped signal, to generate a dehopped signal. The remote-demodulator means is coupled to said remote-acquisition-and-tracking means, and demodulates the dehopped signal into the base-message data.

Technology for building a receiver for receiving a frequency-hopped signal is well known in the art. In FIG. 2, by way of example, the remote-receiver means may include low noise amplifier (LNA) 122, down converter to an intermediate frequency (IF) 123, acquisition-and-tracking means, a demodulator 125, bit deinterleaver 126, FEC decoder 127, and fade detector 129. The acquisition-and-tracking means is embodied as mixer 124 and FH acquisition and tracking circuit 128.

The FEC encoder 101 of FIG. 1 and the FEC decoder 127 in FIG. 2 may use many of the error correction code techniques. Those described in U.S. Pat. No. 4,796,260 entitled SM FEC AND DETECTION CODE, U.S. Pat. No. 4,849,976 entitled PASM AND TASM FORWARD ERROR CORRECTION AND DETECTION CODE, U.S. Pat. No. 4,847,842 entitled SM CODEC FOR PHASE MODULATION, and U.S. Pat. No. 4,849,974 entitled PASM AND TASM FORWARD ERROR CORRECTION AND DETECTION CODE, which are all incorporation herein, are well suited for this invention.

The low noise amplifier 122 is coupled between the remote antenna 121 and the down converter 123. The bit deinterleaver 126 is coupled between the demodulator 125 and the FEC decoder 127. The mixer 124 is coupled between the down converter 123 and the demodulator 125, and to the FH acquisition-and-tracking circuit 128.

In order to prohibit collisions, all of the base stations are synchronized. The plurality of remote units are synchronized to the base stations and hence to each other. In addition, each remote unit in a cell transmits at a frequency which is different from those of all other remote units, as illustrated in FIG. 3. Referring to FIG. 3, during a first hop, a first remote unit, $u_1$, transmits at frequency $f_1$, a second remote unit, $u_2$, at frequency $f_2$, frequency etc. During a second hop, the first remote unit $u_1$ transmits at $f_2$, the second remote unit $u_2$ at $f_3$, etc. Hence, to have C simultaneous conversations, requires a bandwidth $B=Cf_b$, and each communication within a cell, i.e., intra-cell conversation can, in principle, occur without collision.

Concentric Regions to Reduce Interference

Figure 4:
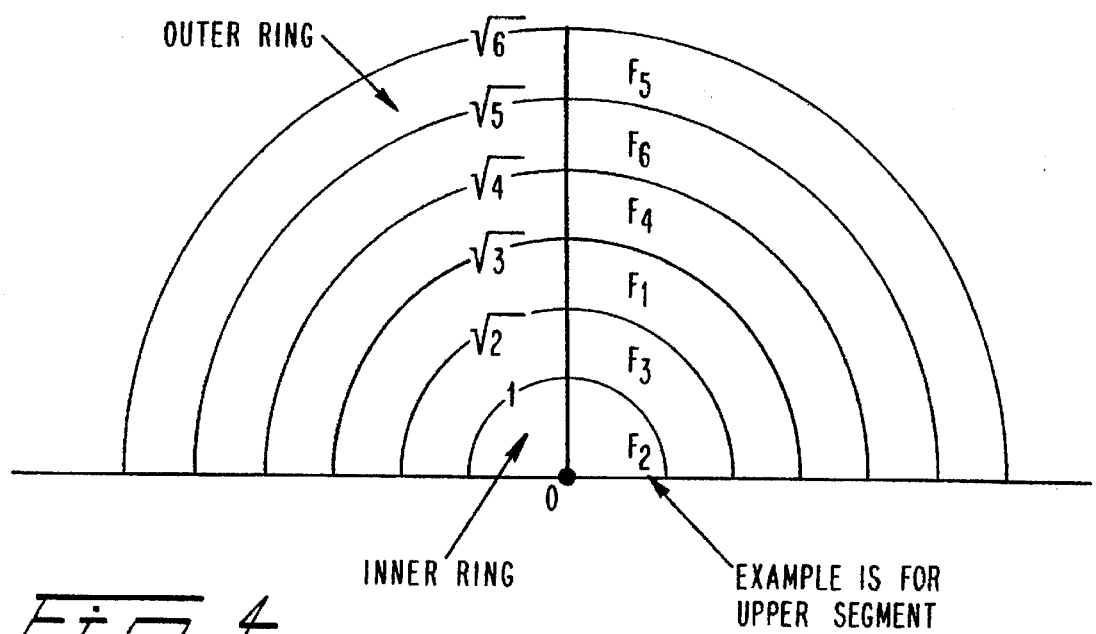
FIG. 4 illustrates the radius of a cell for achieving a constant user density.
Figure 5:
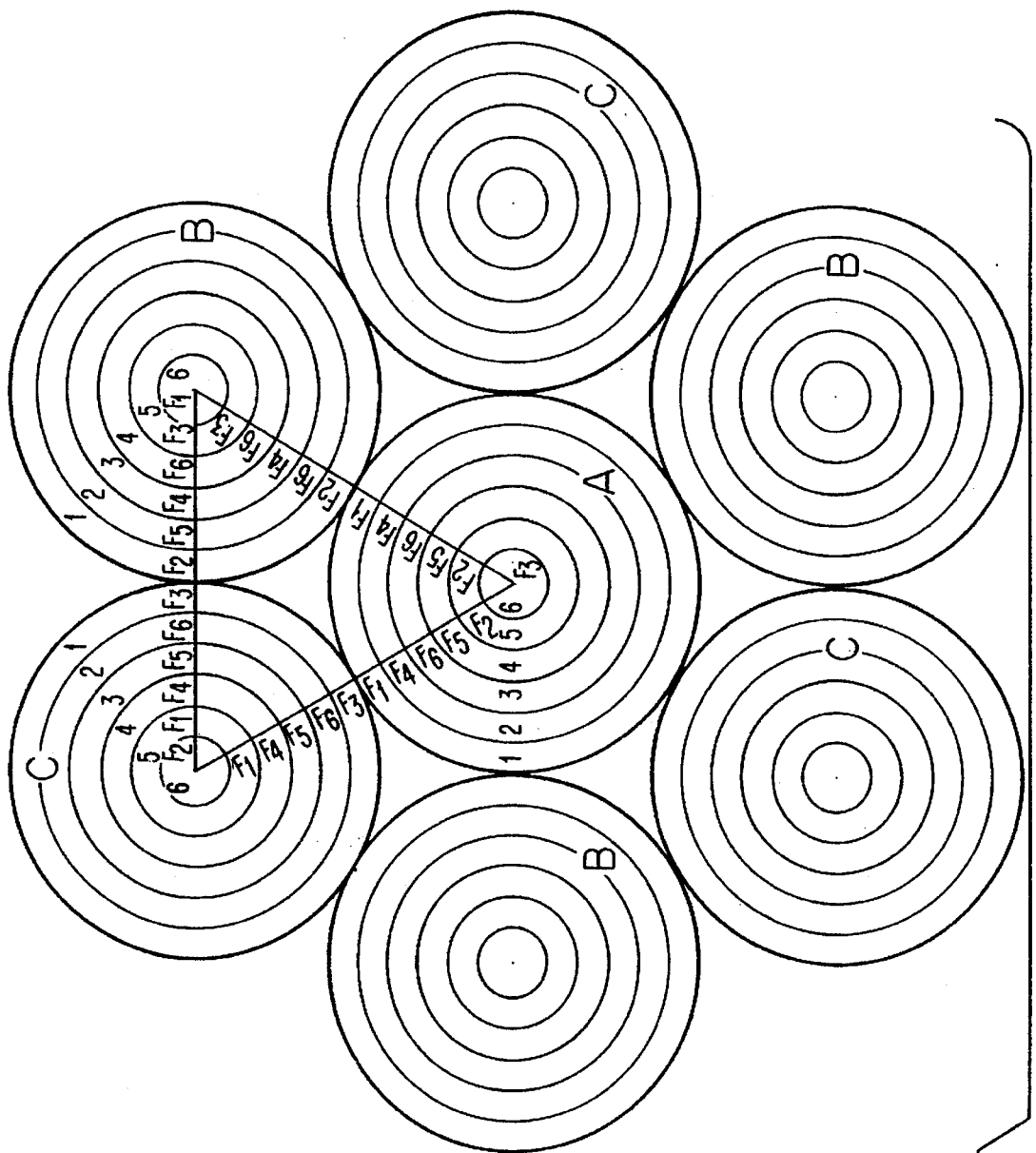
FIG. 5 illustrates FH/CDMA cells using concentric regions with concentric frequency bands.

In an attempt to prevent interference between cells, i.e., intercellular interference, each of the base stations has a coverage area divided into a plurality of N concentric regions. As illustratively shown in FIG. 5, the cell may be divided into six concentric regions, illustrated as concentric rings, about a plurality of base stations. The cells in FIG. 5 are shown as circles rather than as the more typical hexagons for simplicity. Thus, FIG. 5 appears to indicate that there are regions between cells in which there can be no users. This is obviously not the case, but is the result of the artistic liberty taken in drawing the cell shape. In addition, the concentric regions appear to have equal radii. However, to ensure that the user density in each concentric region is constant, one can appropriately adjust the radii of the concentric regions as shown in FIG. 4.

The base station can determine the distance at which the remote unit is located from the base station using any of many different techniques. The base station, for example, can use a command channel of the FH/CDMA system for sending a timing or mark signal. The remote unit may act like a repeater, and relay back to the base station the timing or mark signal on a return command channel. The base station can determine the distance of the remote unit by the round trip time for the mark signal to travel from the base station, to the remote unit, and back to the base station. Alternatively, a remote unit may relay location information to the base station through a command channel. The remote unit may determine its location using well-known geolocation techniques, with reference to two, three, or more, base stations, for example.

In the exemplary arrangement shown in FIG. 5, each concentric region is assigned one of the N sets of frequencies. Each base station communicates with all of the remote units located within its cell. The system bandwidth B, by way of example, is divided into six sets of frequencies and one set of frequencies is allocated to each concentric region. Typically this set exceeds the bandwidth required per user, say, $f_b$ for QPSK, so that a number of users can reside in each ring. Thus, a remote unit $u_1$ in cell A, at a distance $p_4$ from the base station is given a frequency $f_{5,i}$, falling within the band of frequencies $F_5$ allocated to that concentric region. FIG. 5 shows that the band of frequencies marked $F_5$ in cell A is at a different radius from the base station than the band of frequencies $F_5$ in cells B or C. The reason for this difference is to minimize the intercellular interference and thereby reduce the probability of error. Note that a mobile user in cell A at frequency $f_{5,1}$ in band $F_5$ when transmitting to its base receives mobile-to-base interference from the six remote units at frequency $f_{5,1}$, in band. $F_5$ in the six surrounding cells. Interference caused by remote units in more distant cells can be neglected, as the signal strength from remote units in those, more distant, cells to the base of cell A are severely attenuated since signal power may decrease by approximately the $4^{th}$ power of the distance.

In order to understand why different system configurations were selected, it is useful to calculate the worst-case signal-to-interference (S/I) ratio at the base station of cell A. Consider that each band is allocated 15 MHz/6=2.5 MHz. These frequencies are not necessarily contiguous. Then, in band $F_4$ there are about 80 remote units, transmitting at frequencies $f_{4,1}$ to $f_{4,80}$, using QPSK, and letting each remote unit have a bandwidth of about 32 kHz. Six interfering remote units, each at the same frequency $f_{4,1}$, one in each of the six surrounding cells, could be at a point closest to the base station of cell A, thereby creating maximum interference. Consider FIG. 5. Since the interfering power received at the base station of cell A comes from remote units $u_B$ and $u_C$, and noting that the power decreases with the $4^{th}$ power of the distance, band $F_4$ has:

$$\frac{S}{I} = \frac{P_A/(5)^4}{3[P_B/(8)^4 + P_C/(9)^4]} \quad (3)$$

Assuming that $P_A=P_B=P_C$, which would occur in a system with no power control, then $$\frac{S}{I} = 1.34 = 1.3 \text{ dB} \quad (4)$$

In such a worst-case scenario, which, of course, has an extremely small probability of occurrence, the S/I ratio is unacceptably small.

Sectored Antennas To Minimize Interference

Figure 6:
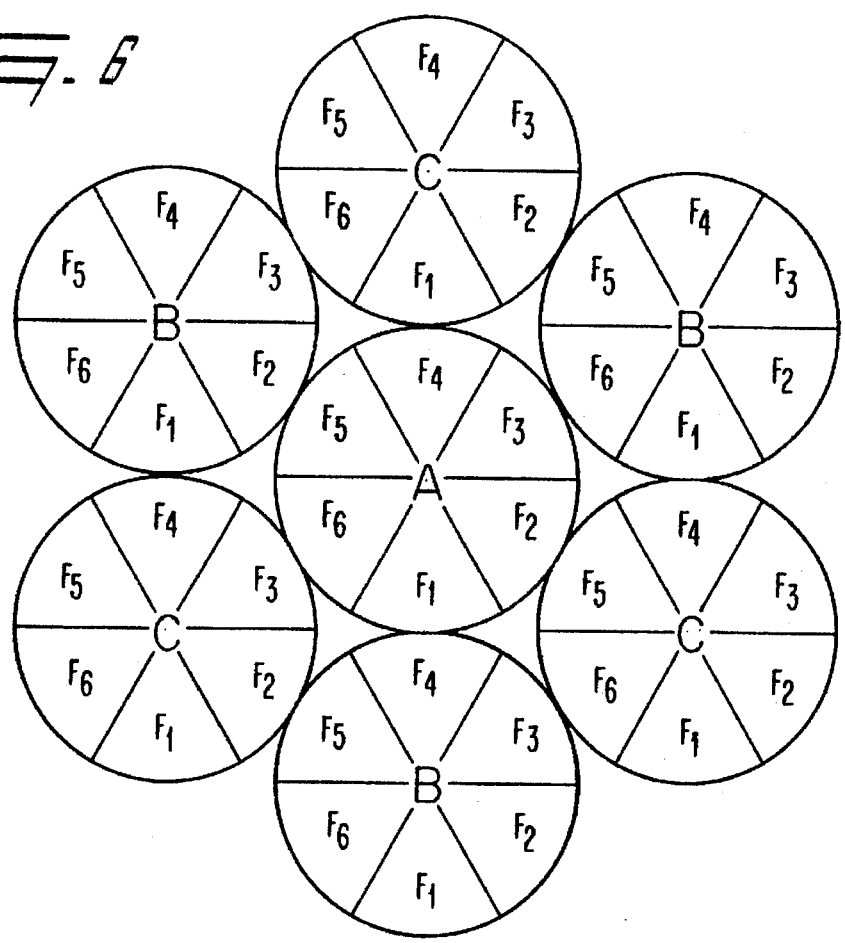
FIG. 6 shows coverage area for six-sector antennas.

In order to reduce the worst-case S/I condition, base-antenna means may be used for sectoring the coverage area into a plurality of sectors. The base-sector means is shown, by way of example, with six-sector antennas selected, in FIG. 6. In this case, each base station uses six antennas and each antenna transmits to remote units in its sector. When a selected-remote unit is located within a particular sector and a particular-geographic region, the base controller sets the set of frequencies used by the base-hopping device. The base station can determine in which of the six sectors the mobile unit is located, by comparing the relative field strength received from a transmitter located on the remote unit, at each of the six antennas. Alternatively, a remote unit may relay location information to the base station through a command channel. The remote unit can determine its location using well-known geolocation techniques with reference to several base stations.

Figure 7:
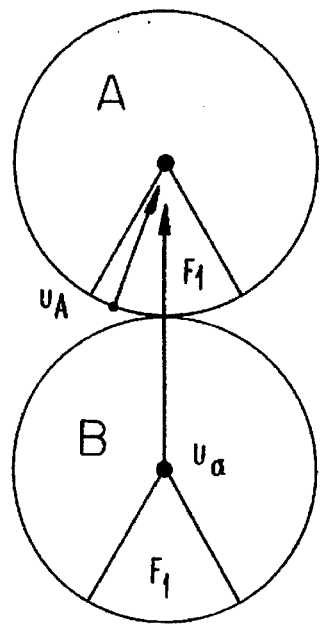
FIG. 7 shows that interference is reduced by $2^4=16$.

The worst-case remote unit-to-base station interference occurs from a single remote unit whose signal can be seen from the base station. This is illustrated in FIG. 7 where remote unit $u_A$ communicates in band $F_1$, at a frequency $f_1$, to the base station at cell A. Remote unit $u_B$, in cell B, below cell A in the figure, also is transmitting in band $F_1$ at the same frequency $f_1$. Since remote unit $u_B$ is within the antenna beamwidth of the base station in cell A, remote unit $u_B$ interferes with remote unit $u_A$. However, it is readily seen that no other remote unit in any of the other adjacent cells interferes Thus, assuming $P_A=P_B$, the worst-case S/I produced by remote unit $u_B$ is S/I=16, i.e., 12 dB, since the worst-case distance ratio is 2:1 and $2^4=16$. The average S/I is, of course, much higher.

Regions and Sectored Antennas Can Reduce Interference

In order to theoretically eliminate the intercell interference, consider the use of six concentric region rings with six-segment antennas. As seen from FIG. 8 each ring is sectored so as to ensure no interference from remote units in adjacent cells.

Consider the remote unit $u_A$ shown in the outer region in cell A in frequency band $F_2$. Interference to its sectored base station in cell A could only come from a remote unit $u_B$ in inner ring at cell B in the band $F_2$. Since band $F_2$ is divided into six sub-bands, band $F_2$ readily is arranged that the frequencies used in frequency band $F_2$ of cell A, designated $F_2(A)$, do not correspond to the frequencies in frequency band $F_2$ of cell B, designated $F_2(B)$ within the same sector. Using this technique, consisting of concentric regions and sectors, there is no interference between adjacent cells, ignoring multipath.

Forward Power Control

Forward Power Control (FPC) is the adjustment of the power transmitted by the base station to achieve a fixed receive power at the remote unit. FPC can be employed to minimize the base station to remote unit interference. The purpose of FPC is to ensure that the signal power transmitted by the base station, received in any frequency region, is the same. Thus, in FIG. 9, using FPC, more power would be transmitted to remote units far from the base station than to remote units close to the base station. Assuming a perfect FPC, the power received by a remote unit $u_1$, at distance r, from the base station, would be the same as the power received by a remote unit $u_2$, a distance $r_2$ from the base station. If their transmitter powers are $P_1$ and $P_2$, respectively, then $$\frac{P_1}{P_2} = \left(\frac{r_1}{r_2}\right)^4 \quad (5)$$

Figure 9:
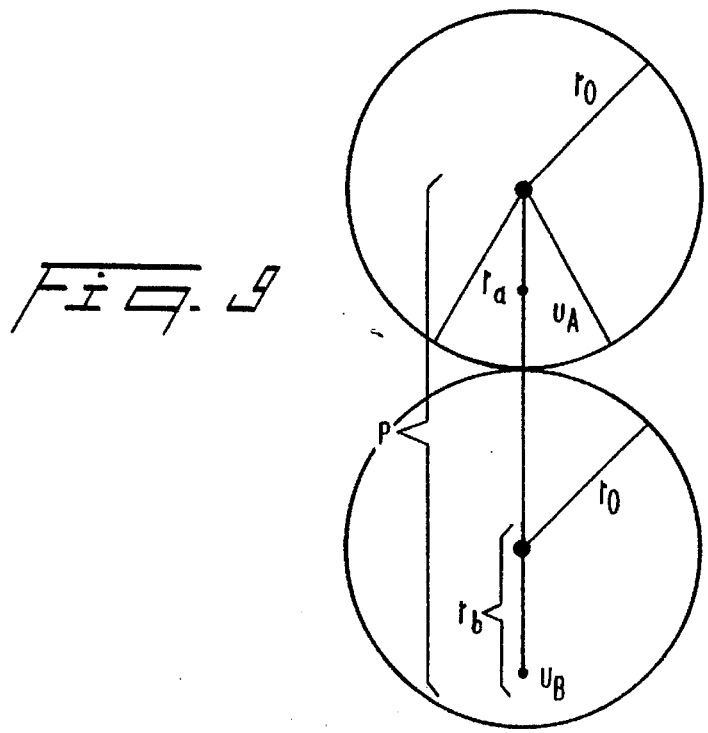
FIG. 9 is an illustration used for a calculation of signal-to-interference ratio produced at a remote unit due to an interfering base station.

Referring to FIG. 9, base station A transmits, at frequency $f_1$, a power $P_A$ to remote $u_A$, and base station B transmits, at frequency $f_1$, a power $P_B$ to remote user $u_B$. Remote unit $u_B$ then receives a signal power S equal to $$S=P_B/(r_b)^4 \quad (6)$$

and an interfering power, I, where $$I=P_A/P^4 \quad (7)$$

If FPC were not used, $P_A=P_B$ and $$\frac{S}{I} = \left(\frac{\rho}{r_b}\right)^4 \quad (8)$$

If FPC is used, $P_A/(r_a)^4=P_B/(r_b)^4$ so that $$\frac{S}{I} = \left(\frac{\rho}{r_a}\right)^4 \quad (9)$$

Thus, FPC does not consistently provide a S/I improvement. For simplicity, the present invention does not require FPC although it could be used.

Reverse Power Control

Reverse Power Control (RPC) requires that a remote unit is received at its base station with the same power regardless of where in the cell the remote unit is positioned.

To determine if RPC can improve the S/I, refer to FIG. 9. Assume that cell A and cell B have a radius $r_o$. Let remote unit $u_A$ be placed a distance $r_a$ from the first base station and remote unit $u_B$ be placed a distance $r_b$ from the second base station, and on a line connecting both base stations. Then the S/I is $$\frac{S}{I} = \frac{P_B/r_b^4}{P_A/(2r_o+r_b)^4} = \frac{P_B}{P_A} \left[ \frac{2r_o+r_b}{r_b} \right]^4 \quad (10)$$

Without RPC, $$\frac{S}{I} = \left( \frac{2r_o+r_b}{r_b} \right)^4 \quad (11)$$

However, with RPC, $$\frac{S}{I} = \left( \frac{2r_o+r_b}{r_a} \right)^4 \quad (12)$$

Since $r_b$ can be larger or smaller than $r_a$, this type of RPC has no consistent advantage in this system.

Rings and Sectored Antennas Can Increase Capacity

Figure 8:
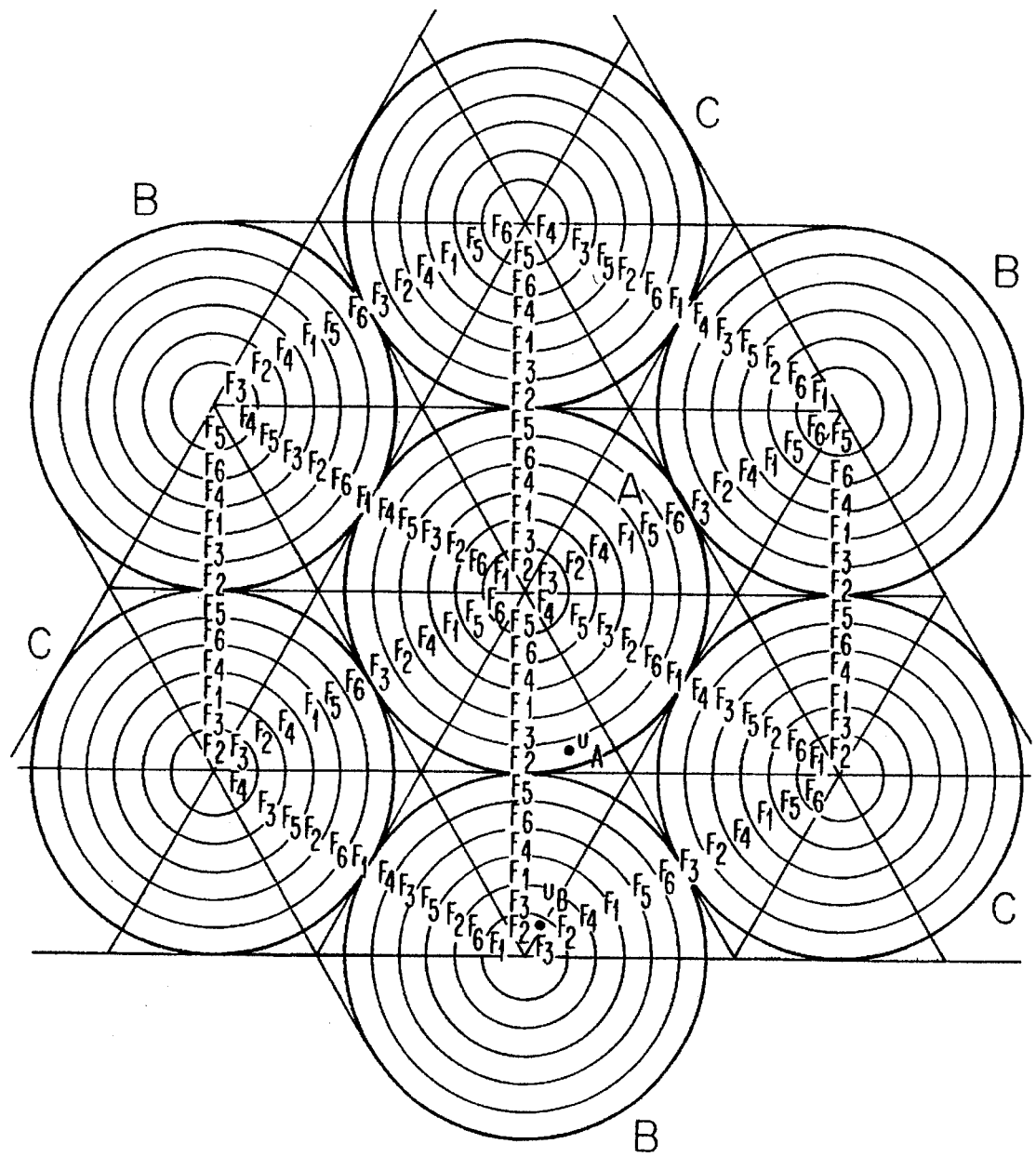
FIG. 8 illustrates a FH/CDMA system, with multiple cells, using concentric frequency bands and six-sector antennas at each base station.

The capacity of the system depicted in FIG. 8 can be increased by a factor of six if:

(1) Each sectored region contains all of the frequencies allocated to that region. For example, each region $F_2$ contains the same 80 frequencies.

(2) The power transmitted by a remote unit in a given region is controlled by the base station and follows the rule shown below:

| Region | Band* | Power Transmitted |
|--------|-------|-------------------|
| Inner, | $F_2$ | $P_o$ |
|        | $F_3$ | $P_o$ |
|        | $F_1$ | $P_o$ |
|        | $F_4$ | $1.4P_o$ |
|        | $F_6$ | $3P_o$ |
| Outer, | $F_5$ | $10P_o$ |

Using this set of transmitted powers, the worst-case S/I is approximately 15 dB and occurs for remote units in bands $F_1$ and $F_4$. The values for the transmitted power shown above have been selected to approximately maximize the S/I ratio, neglecting adjacent sector interference and multipath. However, other values of power can be selected without significant performance degradation.

If the spacing of the regions were selected to allow an equal remote unit density, i.e., each region is of equal area as shown in FIG. 4, then the power transmitted in each region is approximately as follows:

| Region | Band* | Power Transmitted |
|--------|-------|-------------------|
| Inner, | $F_2$ | $P_o$ |
|        | $F_3$ | $P_o$ |
|        | $F_1$ | $P_o$ |
|        | $F_4$ | $1.12P_o$ |
|        | $F_6$ | $1.5P_o$ |
| Outer, | $F_5$ | $2.4P_o$ |

These bands are those shown in the upper segment of cells A, B and C in FIG. 8. The worst-case S/I is approximately 8.5 dB. The values of the transmitted power shown above have been selected to approximately maximize the S/I ratio, neglecting adjacent sector interference and multipath. However, other values of power can be selected without significant performance degradation.

Choosing the Hop Duration

Figure 10:
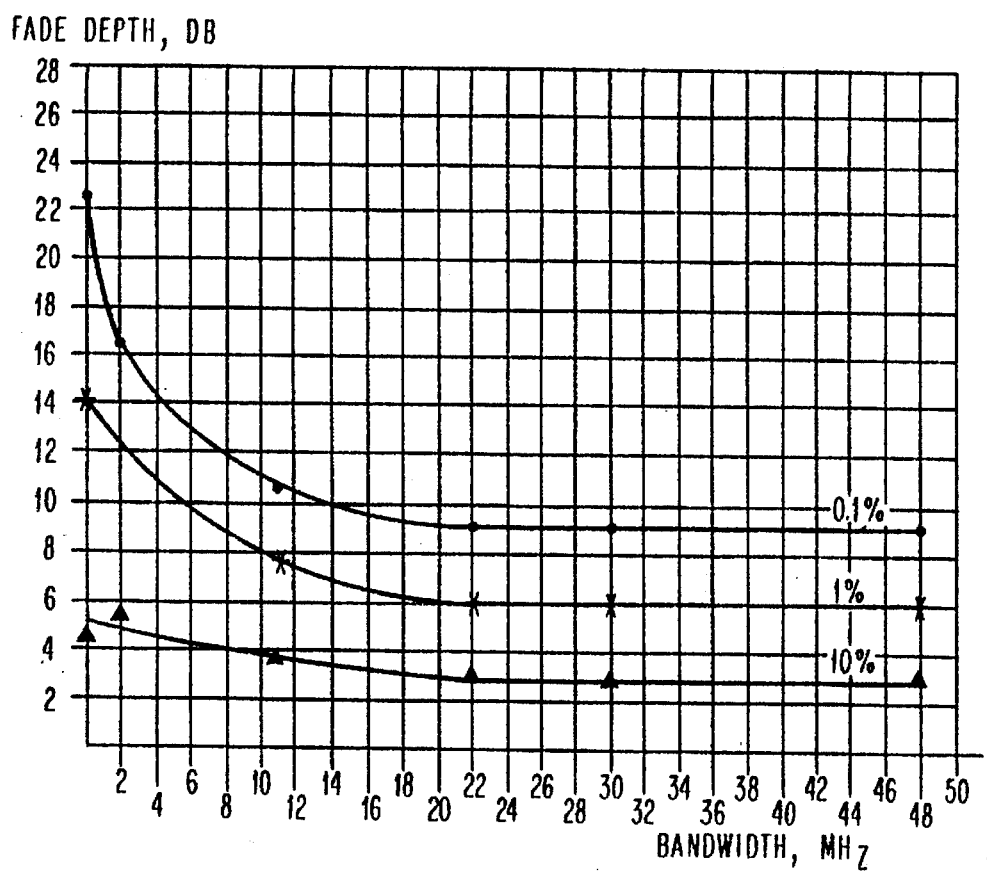
FIG. 10 illustrates fade for a narrowband signal.

The above discussion neglects the effect on system performance of multipath fading. FIG. 10 illustrates that a narrowband, 32 kHz, signal can fade by more than 14 dB, one percent of the time. When such fades occur, the S/I may decrease dramatically and produce a significant number of errors.

The primary purpose of frequency hopping is to move a signal at a frequency $f_i$, which is fading, to a new frequency $f_j$, which may not be fading. To use the entire frequency band effectively, however, all frequencies must be used, even those which fade. Unfortunately, the fading frequencies vary with geography, cars, people, and office environment, so that there is no guarantee of a good, non-fading, frequency.

Figure 11:
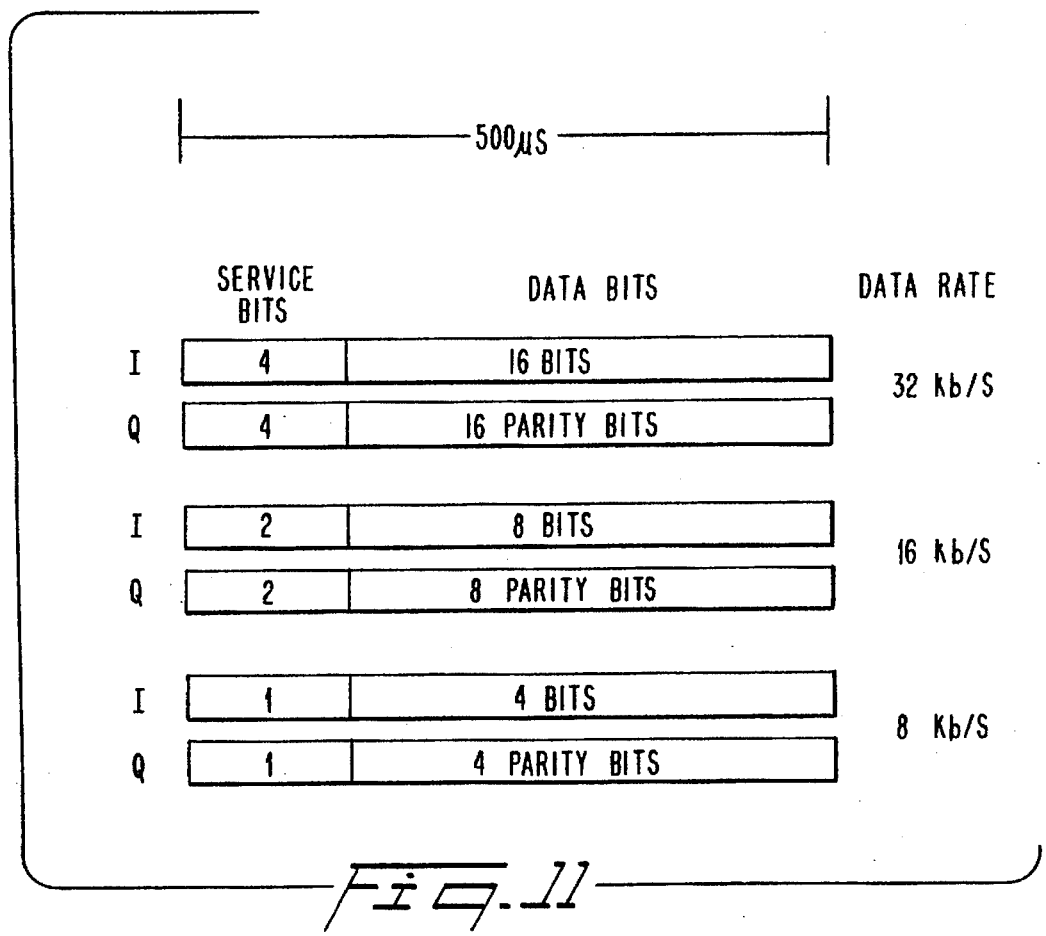
FIG. 11 is a possible frame structure.

A hopping rate can accommodate bit rates from 8 kb/s to 32 kb/s, i.e., 8 kb/s, 16 kb/s and 32 kb/s. At these and higher data rates, an equalizer may be required as a result of multipath returns causing intersymbol interference. In addition, approximately 2 kb/s signaling data is used. A proposed frame structure is shown in FIG. 11. Since the frame is 500 microseconds in duration, the hop rate is 2 khops/s. Forward error correction using a rate ½ convolutional code is then used. Erasures are used since the presence of a deep fade during a hop is readily detected. Other frame and hop rates can be chosen. For example, a 10 millisecond frame with hopping at 100 hops/second is common.

Diversity

The performance of a frequency hopping system can be improved dramatically through the use of space diversity. With this procedure, two antennas at the base station receive the remote unit's transmission and, using the optimal, maximal-ratio combining technique, obtain second-order diversity. Other combining techniques could be used. Furthermore, since the antenna which has received the stronger signal at each of the remote unit's hop frequencies $f_i$, is known, then during the next hop the base station transmits to the remote unit, at frequency $f_i$, using the antenna which received the larger power.

Figure 12:
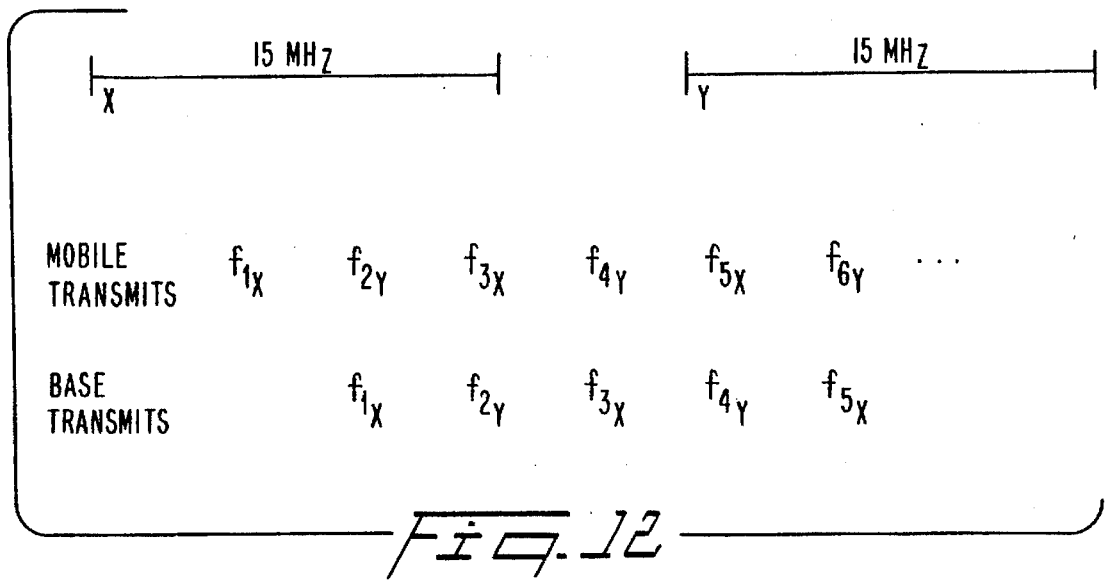
FIG. 12 illustrates how frequencies are selected for frequency hopping to achieve space diversity.

This procedure is illustrated in FIG. 12. In this figure, the transmit and receive bands are called the X and Y bands. The remote units and the base station select frequencies from both bands. Note that the base station transmits at the remote unit's hop frequency one hop later. In this case, the multipath seen is "almost" reciprocal, particularly when a frame is only 500 microseconds in duration.

Using the above procedure the base station and the remote unit each achieve second-order space diversity without any increased complexity in the remote unit's handset.

Handoff

The present invention depends on the ability of a remote unit to switch frequency bands when moving from sector to sector and/or from region to region. A corollary requirement is to provide an adequate number of frequencies in the sector to accommodate different quantities of remote units. For example, in FIG. 6 a maximum of 80 remote units can be accommodated per sector. If 81 remote units appear in a sector and only, say, 75 remote units appear in an adjacent sector, the sector size should be adjustable to meet the demand. This section addresses these concerns.

The frequency hopping remote unit changes frequency, i.e. hops, every 500 microseconds. Thus, every second there are 2000 hops. When the base station records a power level decrease from a remote unit over a reasonably large number of hops, say 100 hops, it tells the remote unit to switch to a new band of frequencies. In addition, as the remote unit moves from sector to sector or from one cell to another, the remote unit receives a slow hopping pilot signal sent from the base station to each sector. Thus, only six pilot signals are required to effect handoff between sectors or cells. That is, the remote unit receives the pilot signals from all nearby sectors. If a pilot signal strength exceeds that of its present pilot signal by a meaningful amount, then the remote unit can request handoff. Other approaches may also be used.

Overlay

In order to overlay on the fixed service microwave user, one of two approaches can be employed. In the first approach, the remote unit users in a cell would affect, at most, one microwave user. The base station, knowing which band of frequencies is used by the microwave user, "locks-out" that band so that the number of remote units in the band is significantly reduced. For example, if the allocated band is 15 MHz and the microwave user has a bandwidth of 10 MHz, then the number of remote units in the cell is only one-third of the maximum possible capacity.

In the second approach, the number of remote units that are allowed on the band occupied by the microwave user is increased until interference is detected by the microwave user. Should the microwave user's signal fade, the number of remote units is decreased.

Impact of Multipath Fading on FH/CDMA

In this section, the signal power, lost due to fading, i.e., the fade depth, required for spread spectrum systems as a function of bandwidth, is presented.

Experiments were performed within buildings, in offices, outdoor in the suburbs and outdoor in New York City. Approximately one million data points were processed to obtain the curves shown below.

Figure 13:
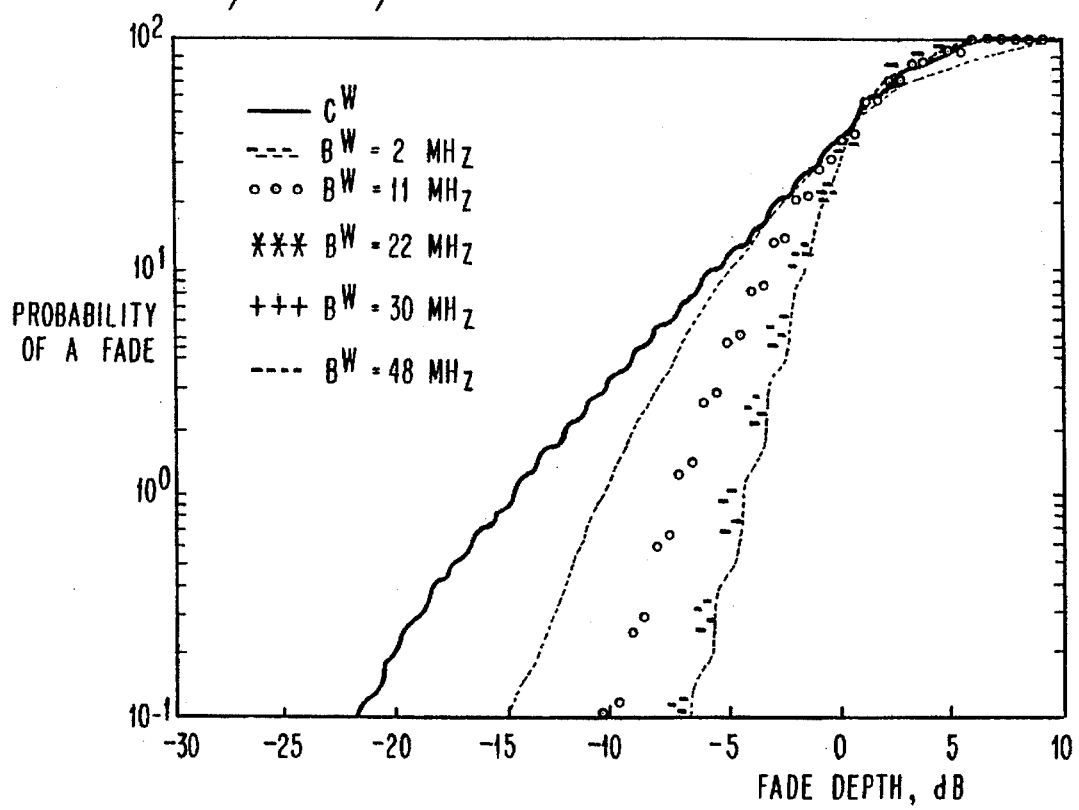
FIGS. 13–15 shows the probability of the received signal power differing from the mean signal power.
Figure 14:
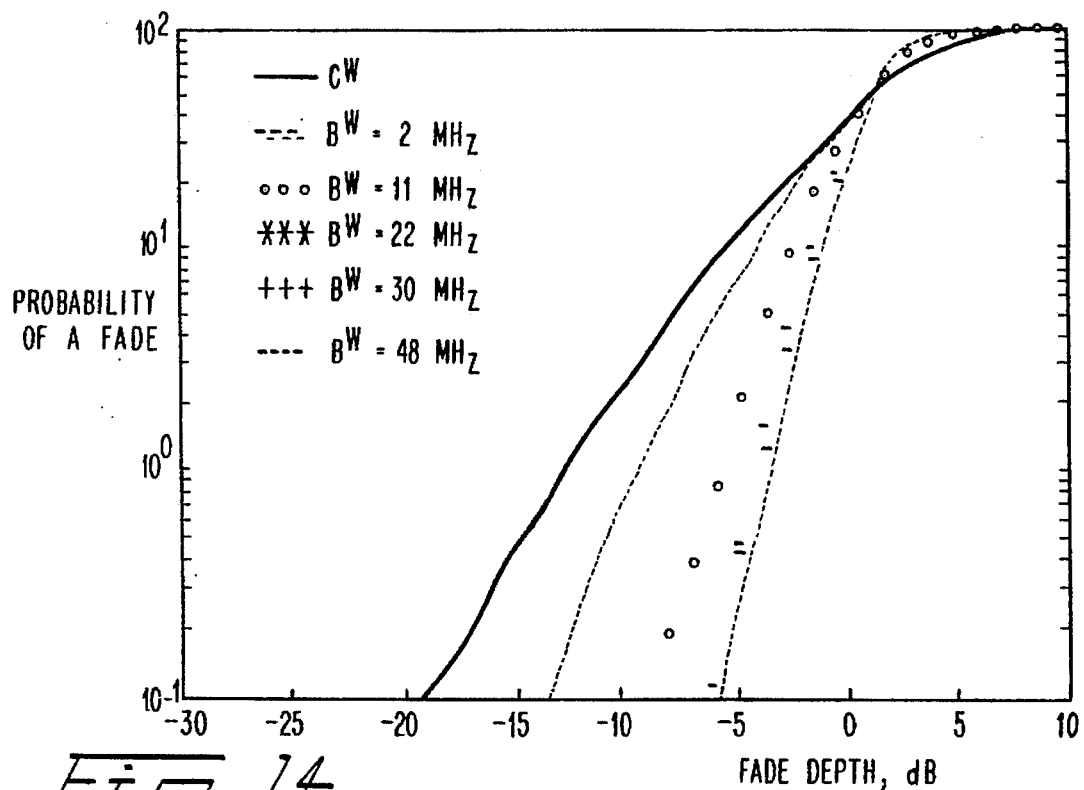
Figure 15:
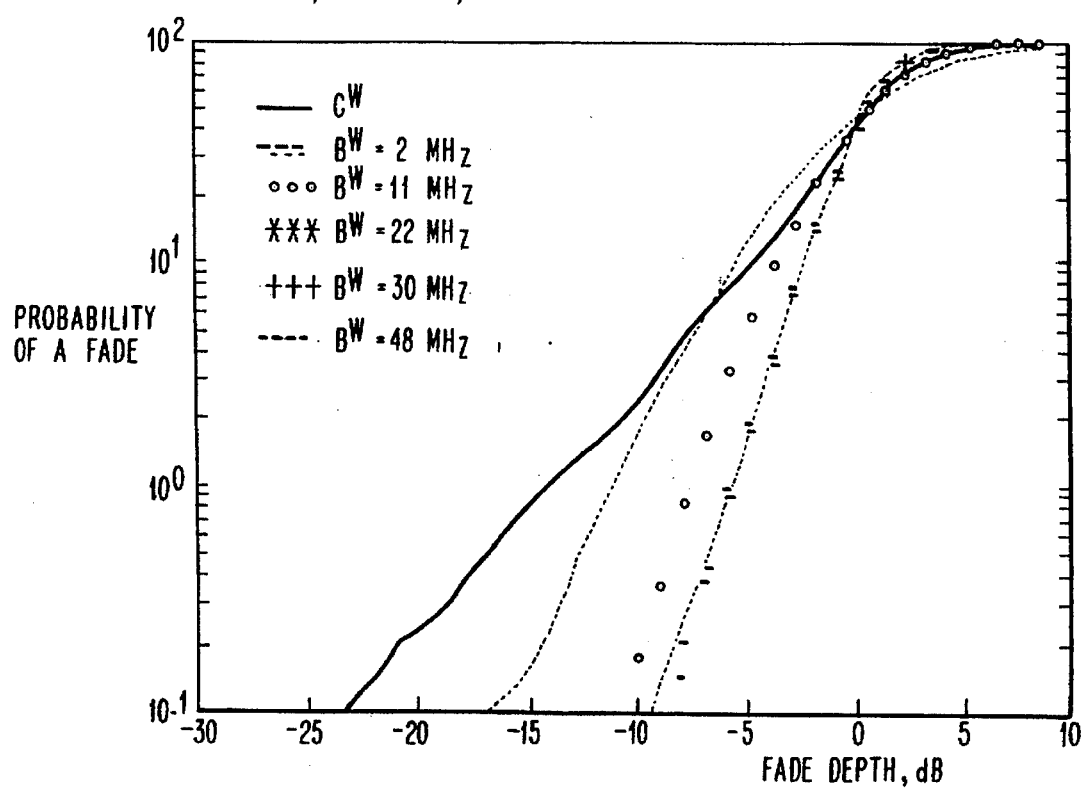

FIGS. 13, 14, and 15 show the probability of the received signal power differing from the mean signal power by more than a prescribed amount, called the fade depth, as a function of bandwidth. For example, in FIG. 13, the data was taken in the suburban community of Port Washington, N.Y. For a bandwidth of 11 MHz, the probability is $10^{-3}$ that the received signal's power fades by more than 10 dB from its median value.

The results shown in this figure for the bandwidths of 11 MHz, 22 MHz, 30 MHz and 48 MHz all yield similar results. However, the fading at 2 MHz and for a CW signal show that very large fade depths can occur.

Figure 16:
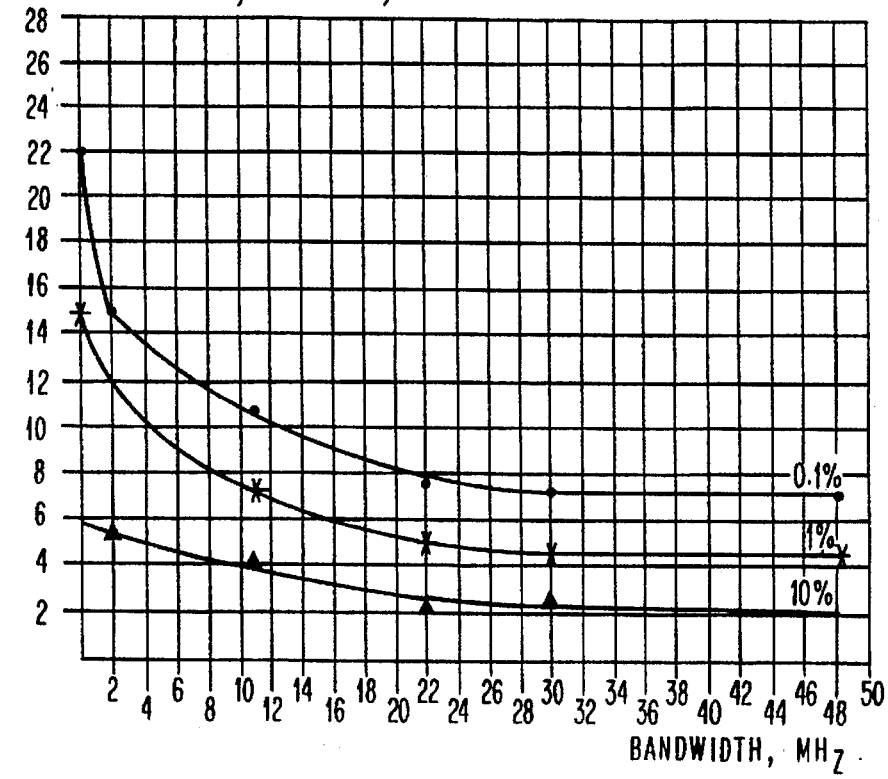
FIG. 16 is a redrawn plot of FIG. 14.
Figure 17:
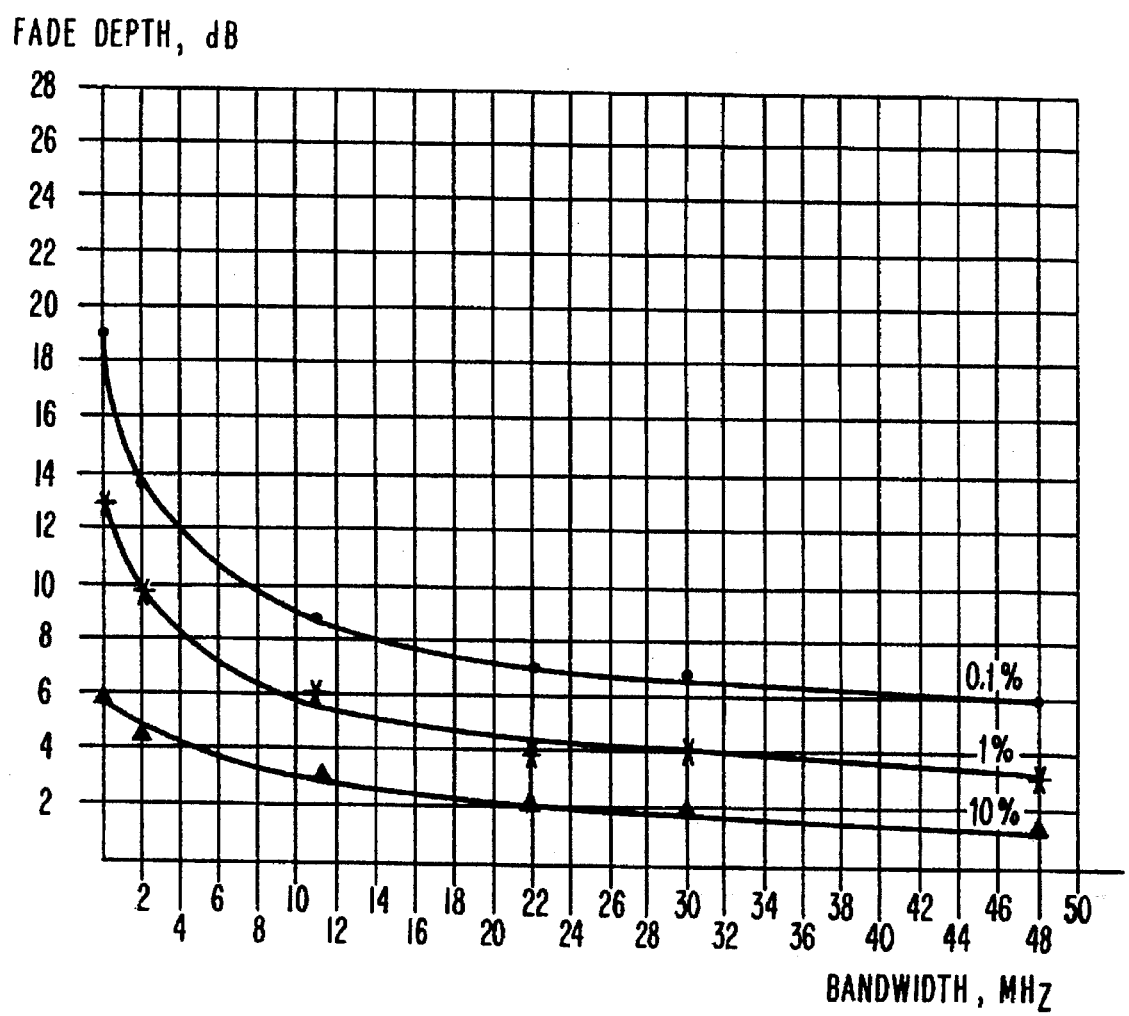
FIG. 17 is a redrawn plot of FIG. 15.

FIGS. 10, 16, and 17 are redrawn plots of FIGS. 13, 14, and 15 for three different probabilities, $10^{-3}$, $10^{-2}$ and $10^{-1}$. Note that the variation in fade depth is less than 1 dB for bandwidths exceeding 20 MHz. At 15 MHz, a bandwidth under consideration by the Federal Communications Commission, a variation not exceeding 2 dB is observed.

Narrowband spread spectrum systems, using a bandwidth of about 1 MHz, fade by 15–19 dB depending on the environment. These are the numbers for a probability of $10^{-3}$.

From the data, the fade depth increases as the bandwidth decreases, and increases in fade depth becomes significant at bandwidths of less than 11 MHz. Since a FH/CDMA system uses an instantaneous bandwidth equal to the bit rate, fading of more than 5 dB occurs less than 10% of the time; however, with a probability of $10^{-3}$ one can have fades exceeding 23 dB.

This patent has presented the design and initial performance analysis of a FH/CDMA microcellular communication system. The system design was based on the philosophy that the most important consideration was that of maximizing channel capacity. Therefore, the resulting design, while practical, was nonetheless complex; it made use of coordinated frequency subbands and antenna sectors to minimize multiple access interference. Thus, while a design of this type requires, for example, more handoffs than might otherwise be needed, it results in a highly effective usage of the frequency spectrum.

It will be apparent to those skilled in the art that various modifications can be made to the frequency hopping code division multiple access system and method of the instant invention without departing from the scope or spirit of the invention, and it is intended that the present invention cover modifications and variations of the frequency hopping code division multiple access system and method provided they come within the scope of the appended claims and their equivalents.

I claim:

1. A frequency-hopping-communications method for communicating base-message data to a plurality of remote units, and for communicating remote unit transmissions to a plurality of base stations, said plurality of base stations communicating base-message data to said plurality of remote units using an assigned system bandwidth B, with the assigned system bandwidth B divided into six sets of frequencies, with each set of the six sets of frequencies having different frequencies from frequencies used in the other sets, each of said plurality of base stations having a coverage area divided into six sectors, with each of said six sectors divided into six concentric regions, with each concentric region of each sector assigned one of the six sets of frequencies, each of said plurality of base stations for communicating with a selected-remote unit located within a particular concentric region of a particular sector, the method including the steps of, converting the base-message data to a form suitable for sending over radio waves;

frequency hopping the converted-base-message data over a first set of frequencies, $F_1$, assigned to a first concentric region of a first sector, thereby generating a frequency-hopped signal using the first set of frequencies, the first set of frequencies having frequencies different from other sets of frequencies used in other concentric regions within the first sector;

controlling, in response to said selected-remote unit being located in the first concentric region of the first sector, the set of frequencies used by a radiating base station for communicating with said selected-remote unit;

amplifying the frequency-hopped signal;

transmitting, using a first sector base antenna for radiating to the first sector, the frequency-hopped signal from the radiating base station to said selected-remote unit;

receiving the frequency-hopped signal at said selected-remote unit;

recovering, from the frequency-hopped signal, the base-message data;

frequency hopping converted-base-message data over a second set of frequencies, $F_2$, assigned to a second concentric region of a second sector, thereby generating a frequency-hopped signal using the second set of frequencies, the second concentric region of the second sector being at a same range from the radiating base station as the first concentric region of the first sector from the radiating base station, the second set of frequencies having frequencies different from other sets of frequencies used in other concentric regions of the second sector, the second set of frequencies also being different from the first set of frequencies;

controlling, in response to said selected-remote unit being located in the second concentric region of the second sector, the set of frequencies used by the radiating base station for communicating with said selected-remote unit;

amplifying the frequency-hopped signal;

transmitting, using a second sector base antenna for radiating to the second sector, the frequency-hopped signal from the radiating base station to said selected-remote unit;

receiving the frequency-hopped signal at said selected-remote unit; and recovering, from the frequency-hopped signal, the base-message data.

2. The frequency-hopping-communications method as set forth in claim 1 further comprising the steps of:

frequency hopping converted-base-message data over a third set of frequencies, $F_3$, assigned to a third concentric region of a third sector, thereby generating a frequency-hopped signal using the third set of frequencies, the third concentric region of the third sector being at a same range from the radiating base station as the second concentric region of the second sector from the radiating base station, the third set of frequencies having frequencies different from other sets of frequencies used in other concentric regions of the third sector, the third set of frequencies also being different from the first set of frequencies and from the second set of frequencies;

controlling, in response to said selected-remote unit being located in the third concentric region of the third sector, the set of frequencies used by the radiating base station for communicating with said selected-remote unit;

amplifying the frequency-hopped signal;

transmitting, using a third sector base antenna for radiating to the third sector, the frequency-hopped signal from the radiating base station to said selected-remote unit;

receiving the frequency-hopped signal at said selected-remote unit; and recovering, from the frequency-hopped signal, the base-message data.

3. A frequency-hopping-communications method for communicating base-message data to a plurality of remote units, and for communicating remote unit transmissions to a base station, said base station communicating base-message data to a plurality of remote units using an assigned system bandwidth B, with the assigned system bandwidth B divided into N sets of frequencies, with each set of the N sets of frequencies having different frequencies from frequencies used in other sets of the N sets of frequencies, the base station having a coverage area divided into a plurality of M sectors, with each of said plurality of M sectors divided into a plurality of N concentric regions, with each concentric region of each sector assigned one of the N sets of frequencies, the base station for communicating with a selected-remote unit located within a particular concentric region of a particular sector, including the steps of:

converting the base-message data to a form suitable for sending over radio waves;

frequency hopping the converted-base-message data over a first set of frequencies, $F_1$, assigned to a first concentric region of a first sector, thereby generating a frequency-hopped signal using the first set of frequencies, the first set of frequencies having frequencies different from other sets of frequencies used in other concentric regions within the first sector;

controlling, in response to said selected-remote unit being located in the first concentric region of the first sector, the set of frequencies used by the base station for communicating with said selected-remote unit;

amplifying the frequency-hopped signal;

transmitting, using a first M-sector base antenna of a plurality of M-sector base antennas for radiating to the first sector, the frequency-hopped signal from the base station to said selected-remote unit, with a number of the plurality of M-sector base antennas at the base station being equal to a number of the plurality of M sectors at the base station;

receiving the frequency-hopped signal at said selected-remote unit;

recovering, from the frequency-hopped signal, the base-message data;

frequency hopping converted-base-message data over a second set of frequencies, $F_2$, assigned to a second concentric region of a second sector, thereby generating a frequency-hopped signal using the second set of frequencies, the second concentric region of the second sector being at a same range from the radiating base station as the first concentric region of the first sector from the radiating base station, the second set of frequencies having frequencies different from other sets of frequencies used in other concentric regions of the second sector, the second set of frequencies also being different from the first set of frequencies;

controlling, in response to said selected-remote unit being located in the second concentric region of the second sector, the set of frequencies used by the radiating base station for communicating with said selected-remote unit;

amplifying the frequency-hopped signal;

transmitting, using a second M-sector base antenna for radiating to the second sector, the frequency-hopped signal from the radiating base station to said selected-remote unit;

receiving the frequency-hopped signal at said selected-remote unit;

recovering, from the frequency-hopped signal, the base-message data;

frequency hopping converted-base-message data over a third set of frequencies, $F_3$, assigned to a third concentric region of the second sector, thereby generating a frequency-hopped signal using the third set of frequencies, the third concentric region of the second sector being at a range from the radiating base station approximately twice the range of the second concentric region of the second sector from the radiating base station, the third set of frequencies having frequencies different from other sets of frequencies used in other concentric regions of the second sector, the third set of frequencies also being different from the first set of frequencies and from the second set of frequencies;

controlling, in response to said selected-remote unit being located in the third concentric region of the second sector, the set of frequencies used by the radiating base station for communicating with said selected-remote unit;

amplifying the frequency-hopped signal;

transmitting, using the second M-sector base antenna for radiating to the second sector, the frequency-hopped signal from the radiating base station to said selected-remote unit;

receiving the frequency-hopped signal at said selected-remote unit;

recovering, from the frequency-hopped signal, the base-message data;

frequency hopping converted-base-message data over the first set of frequencies, $F_1$, the first set of frequencies assigned to a fourth concentric region of the second sector, thereby generating a frequency-hopped signal using the first set of frequencies, the fourth concentric region of the second sector being at a range from the radiating base station approximately three times the range of the second concentric region of the second sector from the radiating base station, the first set of frequencies having frequencies different from other sets of frequencies used in other concentric regions of the second sector, the first set of frequencies also being different from the second set of frequencies and from the third set of frequencies;

controlling, in response to said selected-remote unit being located in the fourth concentric region of the second sector, the set of frequencies used by the radiating base station for communicating with said selected-remote unit;

amplifying the frequency-hopped signal;

transmitting, using the second M-sector base antenna for radiating to the Second sector, the frequency-hopped signal from the radiating base station to said selected-remote unit;

receiving the frequency-hopped signal at said selected-remote unit; and recovering, from the frequency-hopped signal, the base-message data.

4. The frequency-hopping communications method as set forth in claim 3 further comprising the steps of:

frequency hopping converted-base-message data over the first set of frequencies, $F_1$, the first set of frequencies assigned to a fifth concentric region of a third sector, thereby generating a frequency-hopped signal using the first set of frequencies, the fifth concentric region of the third sector being at a range from the radiating base station approximately four times the range of the second concentric region of the second sector from the radiating base station, the first set of frequencies having frequencies different from other sets of frequencies used in other concentric regions of the third sector, the first set of frequencies also being different from the second set of frequencies and from the third set of frequencies;

controlling, in response to said selected-remote unit being located in the fifth concentric region of the third sector, the set of frequencies used by the radiating base station for communicating with said selected-remote unit;

amplifying the frequency-hopped signal;

transmitting, using a third M-sector base antenna for radiating to the third sector, the frequency-hopped signal from the radiating base station to said selected-remote unit;

receiving the frequency-hopped signal at said selected-remote unit; and recovering, from the frequency-hopped signal, the base-message data.

5. The frequency-hopping communications method as set forth in claim 4 further comprising the steps of:

frequency hopping converted-base-message data over the second set of frequencies, $F_2$, the second set of frequencies assigned to a sixth concentric region of a fourth sector, thereby generating a frequency-hopped signal using the second set of frequencies, the sixth concentric region of the fourth sector being at a range from the radiating base station approximately equal to the range of the fifth concentric region of the third sector from the radiating base station, the second set of frequencies having frequencies different from other sets of frequencies used in other concentric regions of the fourth sector, the second set of frequencies also being different from the first set of frequencies and from the third set of frequencies;

controlling, in response to said selected-remote unit being located in the sixth concentric region of the fourth sector, the set of frequencies used by the radiating base station for communicating with said selected-remote unit;

amplifying the frequency-hopped signal;

transmitting, using a fourth M-sector base antenna for radiating to the fourth sector, the frequency-hopped signal from the radiating base station to said selected-remote unit;

receiving the frequency-hopped signal at said selected-remote unit; and recovering, from the frequency-hopped signal, the base-message data.

* * * * *

UNITED STATES PATENT AND TRADEMARK OFFICE
CERTIFICATE OF CORRECTION

PATENT NO. : 5,657,343
DATED : August 12, 1997
INVENTOR(S) : Donald L. Schilling It is certified that error appears in the above-identified patent and that said Letters Patent is hereby corrected as shown below:

Title page, item [57],
In the Abstract, line 21, delete "use" and insert therefor --used--.

At column 6, line 31, delete "on" and insert therefor --in--.

At column 8, line 14, delete the second occurrence of "frequency".

At column 8, line 18, after "conversation" insert therefor --,--.

At column 12, line 18 should be part of line 19.

At column 17, line 19 (claim 3) delete "Second" and insert therefor --second--.

Signed and Sealed this

Thirtieth Day of May, 2000

Attest:

Q. TODD DICKINSON

*Attesting Officer*  *Director of Patents and Trademarks*